United States Patent
Varadarajan et al.

(10) Patent No.: US 11,538,247 B2
(45) Date of Patent: Dec. 27, 2022

(54) METHOD AND SYSTEM FOR MANUFACTURING OPERATIONS WORKFLOW MONITORING USING STRUCTURAL SIMILARITY INDEX BASED ACTIVITY DETECTION

(71) Applicant: Wipro Limited, Bangalore (IN)

(72) Inventors: Sundara Rajan Varadarajan, Sunnyvale, CA (US); Peyman Behbahani, Lafayette, CA (US)

(73) Assignee: Wipro Limited, Bangalore (IN)

( * ) Notice: Subject to any disclaimer, the term of this patent is extended or adjusted under 35 U.S.C. 154(b) by 289 days.

(21) Appl. No.: 17/035,812

(22) Filed: Sep. 29, 2020

(65) Prior Publication Data

US 2022/0101010 A1 Mar. 31, 2022

(51) Int. Cl.
*G06V 20/40* (2022.01)
*G06K 9/62* (2022.01)
*G06N 20/00* (2019.01)
*G06Q 10/06* (2012.01)
*G06F 16/783* (2019.01)

(52) U.S. Cl.
CPC .......... *G06V 20/46* (2022.01); *G06F 16/7847* (2019.01); *G06K 9/6215* (2013.01); *G06N 20/00* (2019.01); *G06Q 10/06393* (2013.01)

(58) Field of Classification Search
CPC .............. G06V 20/40–46; G06V 20/49; G06F 16/7847; G06K 9/6215; G06N 20/00; G06Q 10/06393
See application file for complete search history.

(56) References Cited

U.S. PATENT DOCUMENTS

| | | | |
|---|---|---|---|
| 9,251,598 B2 | 2/2016 | Wells et al. | |
| 9,830,516 B1* | 11/2017 | Biswas | G06V 20/41 |
| 2013/0156304 A1* | 6/2013 | Moorty | G06K 9/00536 |
| | | | 382/159 |
| 2014/0016038 A1* | 1/2014 | Ramaswamy | H04N 5/147 |
| | | | 348/700 |
| 2017/0024614 A1* | 1/2017 | Sanil | G06F 16/70 |
| 2017/0357720 A1* | 12/2017 | Torabi | G06F 16/638 |
| 2019/0333242 A1* | 10/2019 | Chen | G06V 20/653 |
| 2019/0392866 A1* | 12/2019 | Yoon | G11B 27/28 |

(Continued)

FOREIGN PATENT DOCUMENTS

| | | |
|---|---|---|
| WO | 2018040334 A1 | 3/2018 |
| WO | 2020083355 A1 | 4/2020 |

*Primary Examiner* — Aaron W Carter
(74) *Attorney, Agent, or Firm* — Finnegan, Henderson, Farabow, Garrett & Dunner, LLP

(57) ABSTRACT

The present invention discloses a method and a system for monitoring manufacturing operation workflow using Structural Similarity (SSIM) index based activity detection. The method comprising receiving video data corresponding to a manufacturing operation activity, extracting a plurality of video frames from the video data, measuring SSIM index for each video frame of the plurality of video frames with respect to next consecutive video frame of the plurality of video frames, comparing the SSIM index of the each video frame with the SSIM index of next consecutive video frame of the plurality of video frames to identify one or more local maxima, and determining at least one manufacturing operation activity based on the one or more local maxima using machine learning technique.

15 Claims, 7 Drawing Sheets

(56) References Cited

U.S. PATENT DOCUMENTS

| | | | |
|---|---|---|---|
| 2020/0265239 A1* | 8/2020 | Guo | G06K 9/6215 |
| 2020/0380290 A1* | 12/2020 | Sodhani | G06N 20/00 |
| 2022/0021847 A1* | 1/2022 | Maggiore | G06F 21/6218 |
| 2022/0101010 A1* | 3/2022 | Varadarajan | G06K 9/6215 |
| 2022/0101016 A1* | 3/2022 | Sachdeva | G06T 7/0004 |
| 2022/0207273 A1* | 6/2022 | Wu | G07F 17/322 |

* cited by examiner

METHOD AND SYSTEM FOR MANUFACTURING OPERATIONS WORKFLOW MONITORING USING STRUCTURAL SIMILARITY INDEX BASED ACTIVITY DETECTION

TECHNICAL FIELD

The present subject matter is generally related to a field of operation workflow, more particularly, but not exclusively, to a method and a system for monitoring manufacturing operation workflow using Structural Similarity (SSIM) index based activity detection.

BACKGROUND

In industries/factories, manufacturing operation activities involves repetitive tasks. Sometimes these tasks may or may not include human operators to work as a team on multiple manufacturing tasks. For the industries/factories to operate and deliver output at an optimum level requires accurate monitoring of the manufacturing operation activities and correcting inefficiencies based on monitoring data. Existing solution for monitoring production/assembly operations in a shop floor (such as in an assembly line, or in any manufacturing operations line) use template based matching algorithm. However, the template based matching algorithm fails to monitor completely new production/assembly operations who templates are unavailable in the repository. The template based matching algorithm requires large set of image repository along with all the variants of images/video frames for real-time mapping of production/assembly and analysis. This requirement of huge set of template repository decreases system efficiency as huge computation is required for performing the object matching process. Additionally, for scenarios where manufacturing operations are performed manually, every person might vary in skill set, operational efficiency, and pattern of performing operations. In such scenarios, the template based matching algorithm not only lacks efficient monitoring and performance assessment of each individual at different time stamps but also, fails to provide performance assessment of each individual in comparison with other individuals simultaneously.

The information disclosed in this background of the disclosure section is for enhancement of understanding of the general background of the invention and should not be taken as an acknowledgement or any form of suggestion that this information forms the prior art already known to a person skilled in the art.

SUMMARY

There is a need for identifying and timing activities/sub-activities in an operation accurately and identifying inefficiencies in process/operation steps with or without human operator(s) for optimizing productivity and improving quality of a manufacturing operation. Furthermore, there is a need for identifying and accounting for variations in different human operators, for example, height, weight, gender, and hand dexterity (i.e. left-hand vs. right-hand) performing same activities/sub-activities to measure performances to further optimize productivity of the manufacturing operation.

The present disclosure relates to a method and a system for monitoring manufacturing operation workflow using Structural Similarity (SSIM) index based activity detection.

In an embodiment, the present disclosure may relate to a method for monitoring manufacturing operation workflow. The method may include receiving video data corresponding to a manufacturing operation activity, extracting a plurality of video frames from the video data, measuring Structural Similarity (SSIM) index for each video frame of the plurality of video frames with respect to next consecutive video frame of the plurality of video frames and comparing the SSIM index of the each video frame with the SSIM index of next consecutive video frame of the plurality of video frames to identify one or more local maxima. The identifying of one or more local maxima may be based on at least one of a minimal horizontal distance between two SSIM indexes of video frames, and a minimal vertical distance between SSIM index of a video frame and lowest SSIM index of a video frame. Subsequently, the method may include determining at least one manufacturing operation activity based on the one or more local maxima using machine learning technique.

In an embodiment, the present disclosure may relate to a workflow monitoring system for monitoring manufacturing operation workflow. The system may include a processor and a memory communicatively coupled to the processor, wherein the memory stores processor-executable instructions, which on execution, may cause the processor to receive video data corresponding to a manufacturing operation activity, extract a plurality of video frames from the video data, measure Structural Similarity (SSIM) index for each video frame of the plurality of video frames with respect to next consecutive video frame of the plurality of video frames and compare the SSIM index of the each video frame with the SSIM index of the next consecutive video frame of the plurality of video frames to identify one or more local maxima. The identifying of one or more local maxima may be based on at least one of a minimal horizontal distance between two SSIM indexes of video frames, and a minimal vertical distance between SSIM index of a video frame and lowest SSIM index of a video frame. Subsequently, the system may cause the processor to determine at least one manufacturing operation activity based on the one or more local maxima using machine learning technique.

In an embodiment, the present disclosure may relate to a non-transitory computer readable medium including instructions stored thereon that when processed by at least one processor cause a workflow monitoring system to perform operations comprising: receiving video data corresponding to a manufacturing operation activity, extracting a plurality of video frames from the video data, measuring Structural Similarity (SSIM) index for each video frame of the plurality of video frames with respect to next consecutive video frame of the plurality of video frames, comparing the SSIM index of the each video frame with the SSIM index of next consecutive video frame of the plurality of video frames to identify one or more local maxima, wherein the identifying of one or more local maxima is based on at least one of a minimal horizontal distance between two SSIM indexes of video frames, and a minimal vertical distance between SSIM index of a video frame and lowest SSIM index of a video frame, and determining at least one manufacturing operation activity based on the one or more local maxima using machine learning technique.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

FIG. 1 illustrates an exemplary environment for monitoring manufacturing operation workflow in accordance with some embodiments of the present disclosure.

FIG. 2a shows a detailed block diagram of a workflow monitoring system for monitoring manufacturing operation workflow in accordance with some embodiments of the present disclosure. FIG. 2b shows a graph of SSIM index identification of real-time video frames corresponding to a manufacturing operation activity in accordance with some embodiments of the present disclosure. FIG. 2c shows a topographical plot of isolation and prominence parameters of SSIM in accordance with some embodiments of the present disclosure. FIG. 2d shows a graph indicating activity/sub-activity in a manufacturing operation area in accordance with some embodiments of the present disclosure. FIG. 2e shows a graph of start-stop time related to similar activities in a manufacturing operation area in accordance with some embodiments of the present disclosure.

Figure 1:
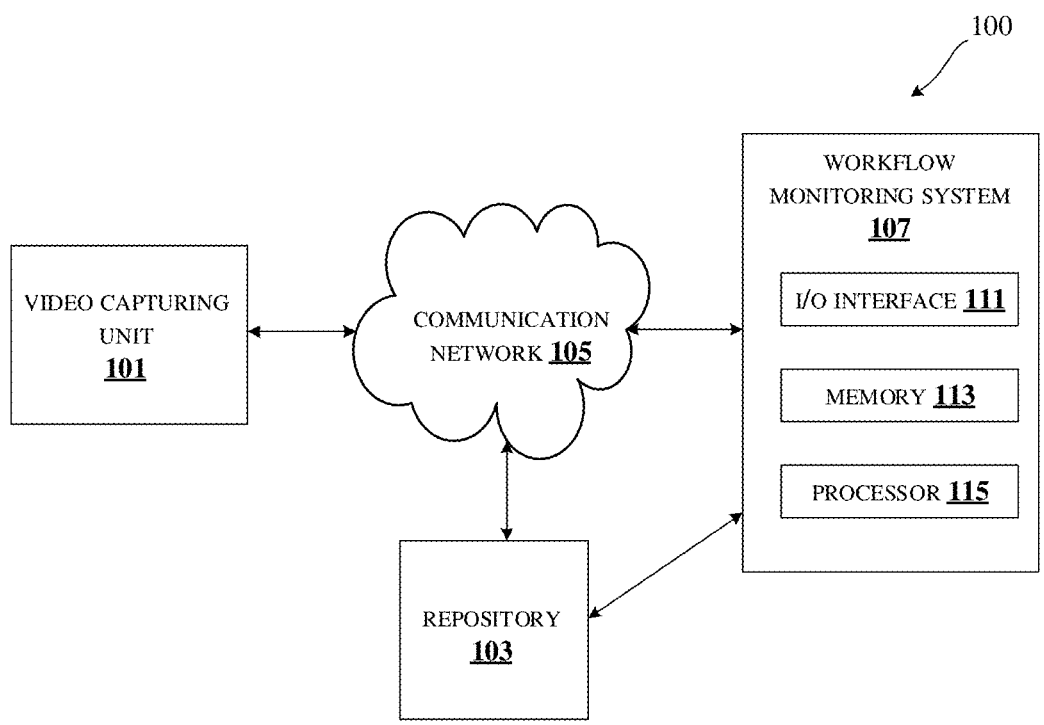

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a system for monitoring manufacturing operation workflow. The present system and method monitor manufacturing operation workflow using SSIM index based activity detection. Any repetitive activity/sub-activity is identified by calculating the SSIM index of video frames. The SSIM index is identified and by calculating the variation of maxima and minima in the SSIM index, different activities/sub-activities are detected. Further, these detected activities/sub-activities are monitored in real-time by time-frequency analysis of SSIM index variation corresponding to multiple activities/sub-activities. The present system and method allow performance analysis of activities/sub-activities and also, trigger alert/signal, if the performance degrades or in case of any sudden interruption in manufacturing operation.

FIG. 1 illustrates an exemplary environment for monitoring manufacturing operation workflow in accordance with some embodiments of the present disclosure.

As shown in the FIG. 1, the environment 100 includes a video capturing unit 101, a repository 103, a communication network 105 and a workflow monitoring system 107. The video capturing unit 101 may be connected through the communication network 105 to the workflow monitoring system 107. In one embodiment, the video capturing unit 101 may be a part of the workflow monitoring system 107. The video capturing unit 101 may capture real-time video data from a manufacturing operation area. The manufacturing operation area may be a place where manual assembly work is performed in real-time. The video capturing unit 101 may be a camera or similar device to capture video data. In one embodiment, there may be a plurality of video capturing unit 101 communicatively connected to a central video capturing control unit to gather video data from different location/region of manufacturing operation area. In another embodiment, a plurality of Internet of Things (IoT) sensors may be communicatively connected to the video capturing unit 101 to capture other data like position/location data, voice data and the like. The video capturing unit 101 may capture and provide video data of human operators to the workflow monitoring system 107 via the communication network 105. The video data may be at least one of a real-time video of human operators in a manufacturing operation area and recorded video of human operators in a manufacturing operation area. In one embodiment, the video capturing unit 101 may capture and provide video data of computer-controlled machines/robots to the workflow monitoring system 107 via the communication network 105. In this case, the video data may be at least one of a real-time video of computer-controlled machines/robots in a manufacturing operation area and recorded video of computer-controlled machines/robots in a manufacturing operation area. In another embodiment, the video capturing unit 101 may capture and provide video data of both human operator and computer-controlled machines/robots to the workflow monitoring system 107 via the communication network 105. The communication network 105 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi, Bluetooth and the like.

In the embodiment, the workflow monitoring system 107 may perform monitoring of manufacturing operation workflow. The workflow monitoring system 107 may include an I/O interface 111, a memory 113 and a processor 115. The I/O interface 111 may be configured to receive the video data from the video capturing unit 101. The I/O interface 111 may employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax), or the like.

The video data received by the I/O interface 111 from the video capturing unit 101 may be stored in the memory 113. The memory 113 may be communicatively coupled to the processor 115 of the workflow monitoring system 107. The memory 113 may, also, store processor instructions which may cause the processor 115 to execute the instructions for monitoring manufacturing operation workflow. The memory 113 may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 115 may include at least one data processor for monitoring manufacturing operation workflow. The processor 115 may include specialized processing units such as integrated system (bus) controllers, memory management control units, floating point units, graphics processing units, digital signal processing units, etc.

In the embodiment, the workflow monitoring system 107 may exchange data with the repository (i.e. database) 103 directly or through the communication network 105. The repository 103 may, also, be referred as activity/sub-activity repository unit. In one embodiment, the repository 103 may be a cloud based central repository and may collect data from various manufacturing operation units/areas. The repository 103 may store real-time data related to real-time activity/sub-activity obtained from monitoring manufacturing operation activity from at least one of the workflow monitoring system 107, the video capturing unit 101 and the IoT sensors. The data may include at least one of video data, parameters related to real-time manufacturing operation activity, date, start-stop time related to similar activities in a manufacturing operation area and Key Performance Indicators (KPIs). The parameters may comprise isolation and prominence parameters of the SSIM technique. The repository 103 may, also, be populated or stored with historic data. Here, the historic data (i.e. recorded data) may refer to data received from at least one of the workflow monitoring system 107, the video capturing unit 101 and the IoT sensors of activity/sub-activity in past (i.e. history). The historic data may include at least one of historic video data, historic parameters related to past manufacturing operation activity, historic date, historic start-stop time related to similar activities in a manufacturing operation area and historic KPIs. The historic parameters may comprise isolation and prominence parameters of the SSIM technique. The repository 103 may provide at least one of real-time data and historic data to the workflow monitoring system 107 for comparing the real-time data for further analytics.

The repository 103 may, also, be updated at pre-defined intervals of time. These updates may be related to at least one of video data, parameters related to manufacturing operation activity, date, start-stop time related to similar activities in a manufacturing operation area and KPIs.

Figure 2A:
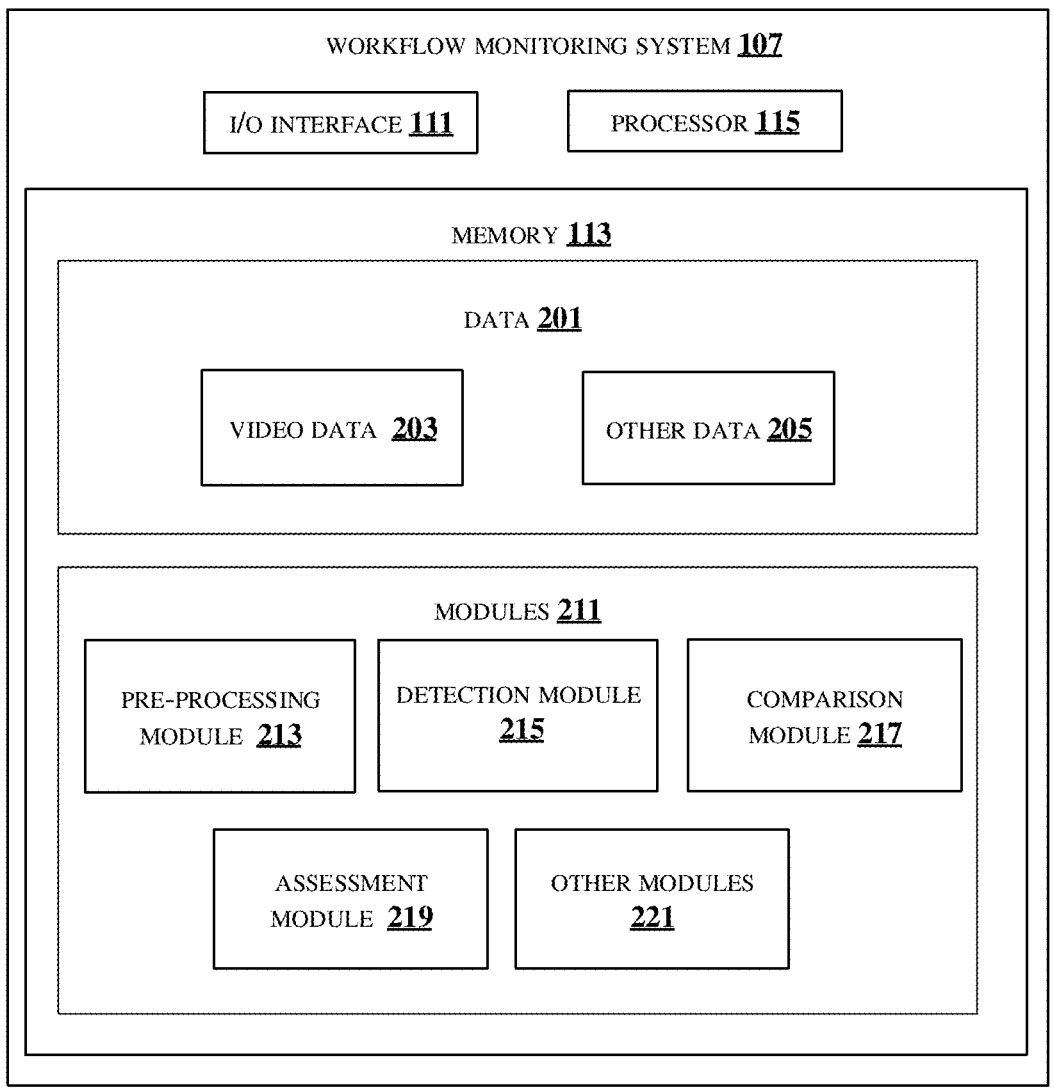

FIG. 2a shows a detailed block diagram of a workflow monitoring system for monitoring manufacturing operation workflow in accordance with some embodiments of the present disclosure.

The workflow monitoring system 107, in addition to the I/O interface 111 and processor 115 described above, may include data 201 and one or more modules 211, which are described herein in detail. In the embodiment, the data 201 may be stored within the memory 113. The data 201 may include, for example, video data 203 and other data 205.

The video data 203 may include video data that refer to video (i.e. visual) of at least one of human operators and computer-controlled machines/robots in a manufacturing operation area captured at real-time. In one embodiment, the video data 203 may, also, comprise voice data in addition to video. The I/O interface 111 of the workflow monitoring system 107 may receive the video data of the at least one of human operator and computer-controlled machine/robot at real-time from the video capturing unit 101 and may store in the video data 203.

The other data 205 may store data, including temporary data and temporary files, generated by modules 211 for performing the various functions of the workflow monitoring system 107.

In the embodiment, the data 201 in the memory 113 are processed by the one or more modules 211 present within the memory 113 of the workflow monitoring system 107. In the embodiment, the one or more modules 211 may be implemented as dedicated hardware units. As used herein, the term module refers to an Application Specific Integrated Circuit (ASIC), an electronic circuit, a Field-Programmable Gate Arrays (FPGA), a combinational logic circuit, and/or other suitable components that provide the described functionality. In some implementations, the one or more modules 211 may be communicatively coupled to the processor 115 for performing one or more functions of the workflow monitoring system 107. The said modules 211 when configured with the functionality defined in the present disclosure will result in a novel hardware.

In one implementation, the one or more modules 211 may include, but are not limited to, a pre-processing module 213, a detection module 215, a comparison module 217, and an assessment module 219. The one or more modules 211 may, also, include other modules 221 to perform various miscellaneous functionalities of the workflow monitoring system 107.

The pre-processing module 213 may, also, be referred as video frames pre-processing unit. The pre-processing module 213 may receive video data corresponding to a manufacturing operation activity at real-time from the video capturing unit 101 via the communication network and the I/O interface 111. The video data received from the video capturing unit 101 may be unprocessed real-time video data. Subsequently, the pre-processing module 213 may process the unprocessed real-time video data received from the video capturing unit 101. For processing, the pre-processing module 213 may read the video data and extract a plurality of video frames from the video data. In one embodiment, when video data is received from a plurality of video capturing unit 101, the video data may contain different specifications such as different frame rates. In such situations, the pre-processing module 213 may, also, read the video data and extract a plurality of video frames from the video data such that the plurality of video frames has same frame rate. The pre-processing module 213 may convert the frame rate to an optimal value for frame per seconds depending upon the type of manufacturing operation tasks which is to be analysed. For example, a video with a minimum of 5 frames per second may be recommended to monitor human activities.

The plurality of video frames may be subjected to data filtering. In the data filtering, the plurality of video frames, which are in Red Green Blue (RGB) color format, may be converted to a grayscale format. The conversion of the plurality of video frames from the RGB color format to the grayscale format do not affect the information present in the video frames but conversion to the grayscale format significantly improves the performance of SSIM technique and requires less processing power and memory in comparison to processing video frames in the RGB color format. In addition, as a part of data filtering, consecutive video frames may be checked for similarity. If the consecutive video frames are similar to each other (for example, similarity is greater than 97%), then one of the consecutive video frames may be excluded from subsequent processing steps. This process of excluding/cropping video frames increase the overall system performance. An object detection/deep learning technique may be used for excluding one of the consecutive video frames, which may not be relevant with respect to manufacturing operation activity. In one embodiment, the process of excluding/cropping video frames may be performed by the detection module 215 instead of the pre-processing module 213 by removing one or more video frame from the plurality of video frames when the SSIM index is greater than a predefined value.

Figure 2B:
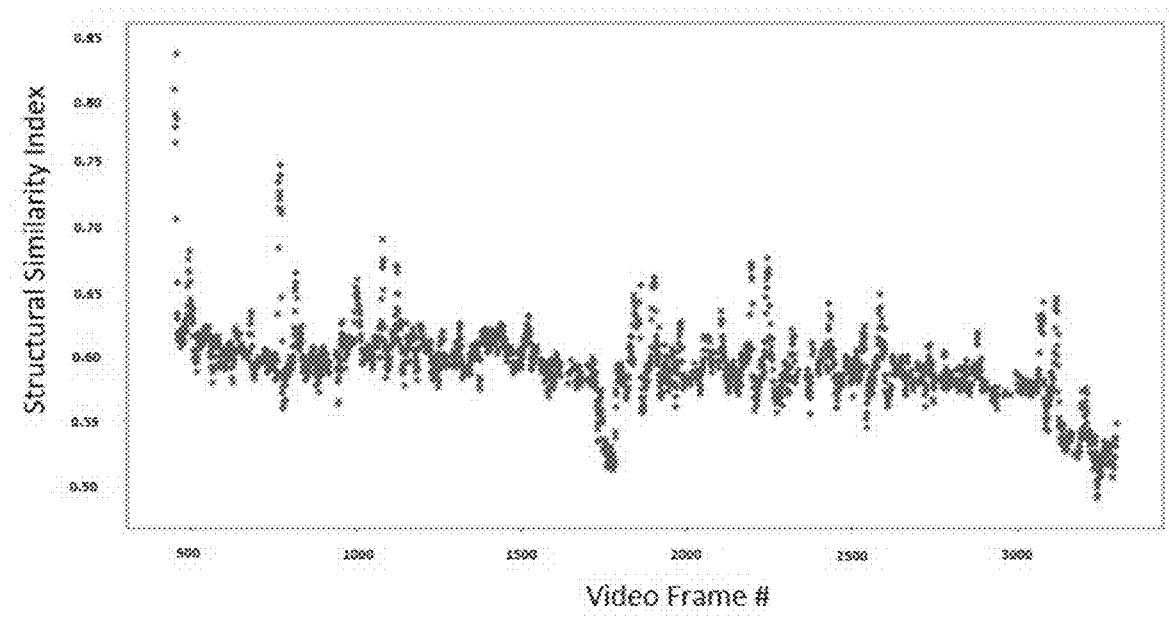

The detection module 215 may, also, be referred as activity/sub-activity detection unit. The detection module 215 may determine various periodical (i.e. repetitive) activity/sub-activity based on relation of the video frames with the upcoming stream of video frames. In a repetitive activity, similar frame is expected to be repeated on an almost similar interval. Structural similarity (SSIM) index technique may be used for measuring similarity between two consecutive video frames. The detection module 215 may measure SSIM index for each video frame of the plurality of video frames with respect to next consecutive video frame of the plurality of video frames. The SSIM index may depict the similarity level between two consecutive video frames, as shown in FIG. 2b. The output values may lie between [0,1] where value 1 may only be reachable in the case of two consecutive video frames are identical (i.e. two sets of video frames have identical data). This case may be indicative of perfect structural similarity. A value of 0 may indicate no structural similarity. In the present application, the SSIM may be made consistent with human eye perception. In one embodiment, Multi-scale SSIM (MSSIM) may be utilized to conduct multi-stage sub-sampling to convert repetitive activities in time series data format.

Figure 2C:
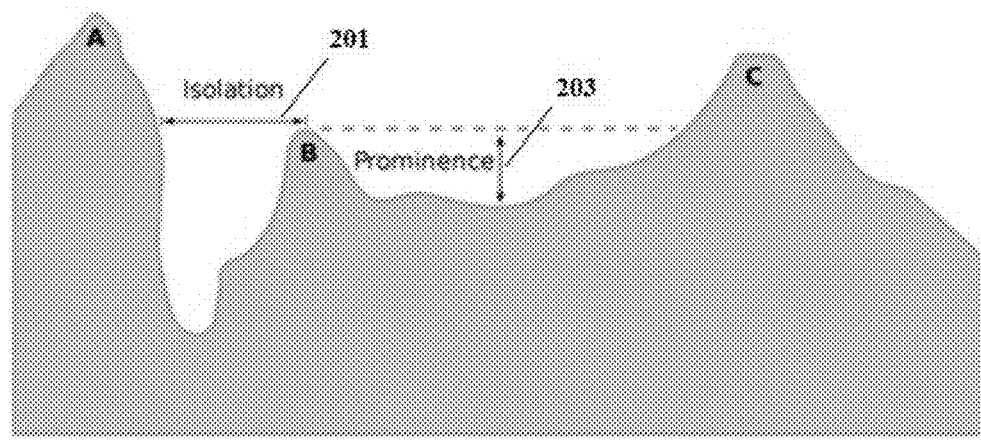

At this stage, the detection module 215 may use SSIM technique to find all local maxima by comparison of neighbouring SSIM index. The detection module 215 may compare the SSIM index of the each video frame with the SSIM index of next consecutive video frame of the plurality of video frames to identify one or more local maxima. The identifying of one or more local maxima may be based on isolation and prominence parameters of SSIM technique. The isolation parameter may specify minimal horizontal distance or isolation between two SSIM indexes of video frames (i.e. neighbouring peaks of SSIM index), shown as reference 201 in FIG. 2c. This parameter may remove smaller peaks until condition is fulfilled for all remaining maxima. The isolation parameter may depend on the cycle frequency of the repetitive activity/sub-activity. The prominence parameter may measure a minimal vertical distance between SSIM index of a video frame and lowest SSIM index of a video frame (i.e. how much a peak stands out from the surrounding baseline), shown as reference 203 in FIG. 2c. Both prominence and isolation parameters help capture maximum values by eliminating the noise from time-series data.

Figure 2D:
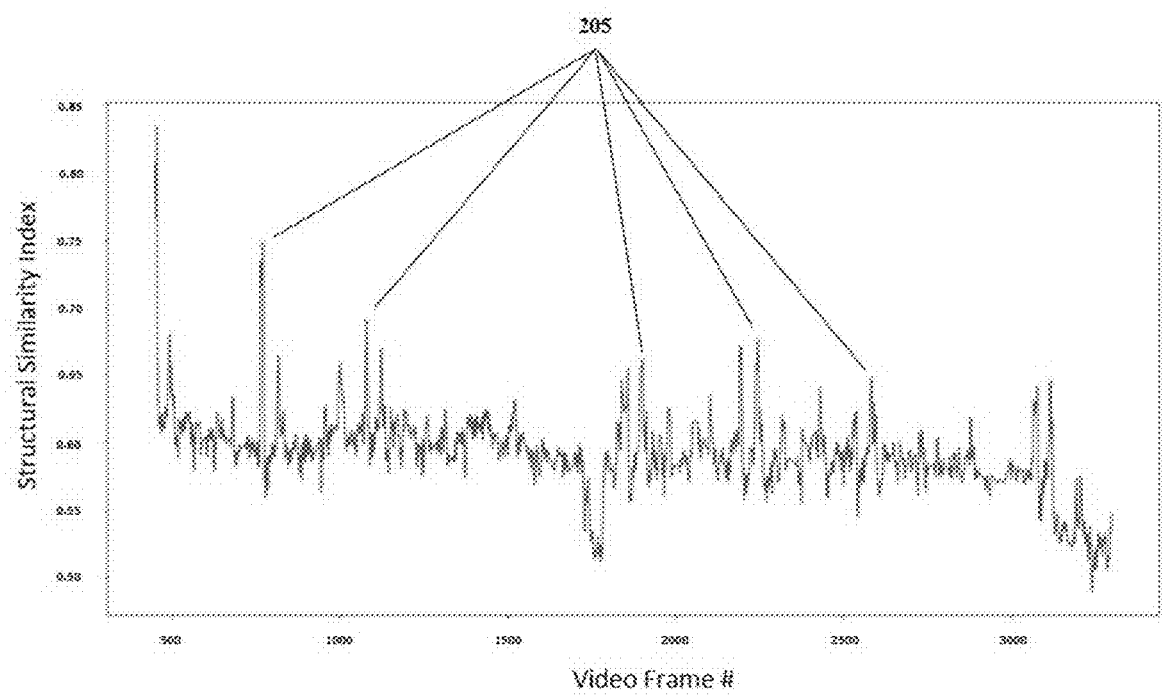

In final stage, the detection module 215 may determine at least one manufacturing operation activity/sub-activity based on the one or more local maxima using machine learning technique. The local maxima are likely to be the repeated activities/sub-activities, shown as reference 205 in FIG. 2d. Machine learning technique or cognitive computing based intelligent techniques may be implemented to identify activity/sub-activity in the manufacturing operation. This technique may consider previously identified behaviors of activity/sub-activity and utilized those to predict the start and end time of the activity.

Figure 2E:
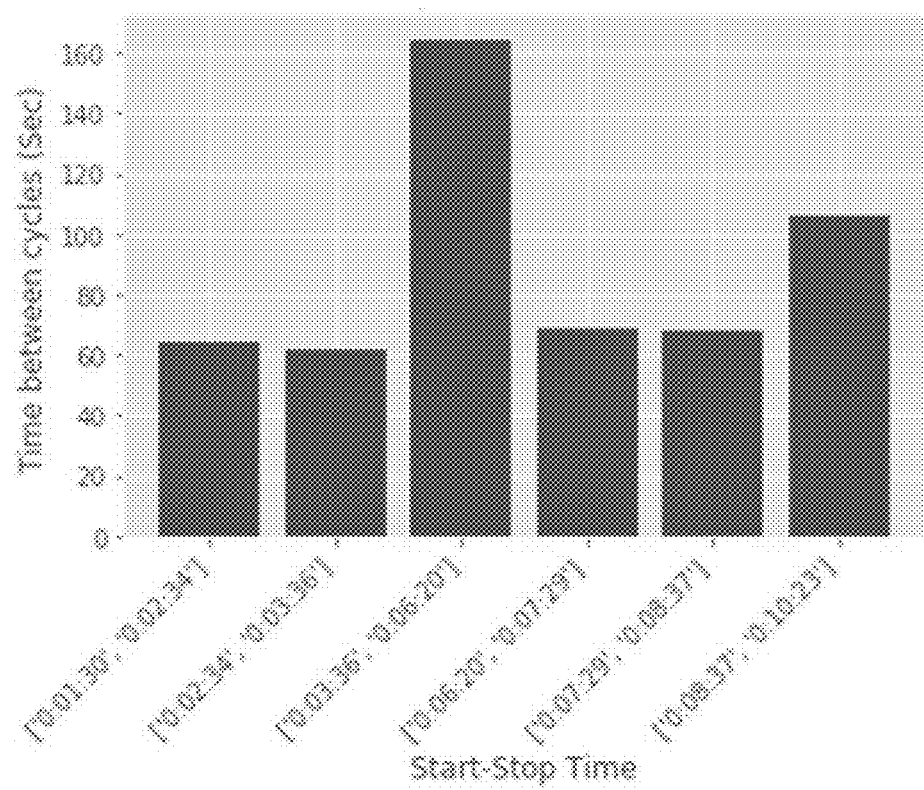

The comparison module 217 may, also, be referred as activity/sub-activity comparison unit. The comparison module 217 may identify and correct the missed identified activities. In a repeated task, the order of activities is expected to be the same. The comparison module 217 may determine time interval for each of the at least one manufacturing operation activity to identify variation in manufacturing operation activity. The comparison module 217 may compare various peaks identified from the output of the detection module 215 to detect next similar trend for detecting time intervals/frequency of various activity/sub-activity in the manufacturing operation area. An example is shown in FIG. 2e, which shows a graph of start-stop time (on x axis) versus time taken to complete an activity for similar activities (on y axis) in a manufacturing operation area. The comparison module 217 may, also, receives activity/sub-activity data from previous timestamp video frames from the repository 103 to compare with the present detected activity/sub-activity. The comparison module 217 may, also, remove the outlier (false positive activity/sub-activity) data which might occur due to sudden disturbance or some noise effect. For instance, there may be multiple video capturing units 101 capturing similar type of manufacturing operation activities in parallel (i.e. plurality of manufacturing operation workers performing similar tasks). In this case, the comparison module 217 may compare the activity/sub-activity detected from individual tasks from different individuals to identify and remove outliers or false positive activity/sub-activity. In one embodiment, the comparison module 217 may use machine learning techniques to perform its function.

The assessment module 219 may, also, be referred as performance assessment unit. The assessment module 219 along with the detection module 215 may identify and time activities/sub-activities in at least one manufacturing operation accurately. The assessment module 219 may extract parameters related to the at least one manufacturing operation activity, compare the extracted parameters with historic parameters related to past manufacturing operation activity and calculate Key Performance Indicator (KPI) related to the at least one manufacturing operation activity based on comparison. Furthermore, the assessment module 219 may produce statistical information such as number of completed tasks/activities, performance of a team and individuals (relative to other individuals) over time, bottlenecks and/or inefficiencies in manufacturing operation, distracted index, and KPIs from the output received from the detection module 215 and the comparison module 217. Based on the KPIs, distraction index (i.e. laxity during activity) may be modelled. The assessment module 219 may, also, compare performance from the previously identified performances (historical data) to precisely identify the performance of the plurality of activity/sub-activity in the manufacturing operation. Based on at least one of the calculated KPIs and the statistical information, the assessment module 219 allows for maximizing productivity, improving quality and establishing standard of a manufacturing operation. Furthermore, using at least one of the calculated KPIs and the statistical information, the assessment module 219 may identify and account for variations in different human operators, for example, height, weight, gender, and hand dexterity (i.e. left-hand vs. right-hand) performing same activities/sub-activities. This approach allows overcoming variations in human operators' performances, thereby, improving productivity of the manufacturing operation further. All the statistical information may be stored in the repository 103, which may be used for further analysis. The assessment module 219 may, also, report the performance to a user who may be supervising the manufacturing operation activities. This module 219 may provide alert to the user if the activity/sub-activity performance degrades/crosses a predefined threshold level. In one embodiment, the alert may be a mobile notification as a message, voice prompt or alarm signal. The assessment module 219 may provide the user with individual performance report to identify individual performance In one embodiment, the performance report may be based on hourly, weekly or monthly timeline. The assessment module 219 may, also, provide production report to identify the overall performance of manufacturing operation unit.

Figure 3:
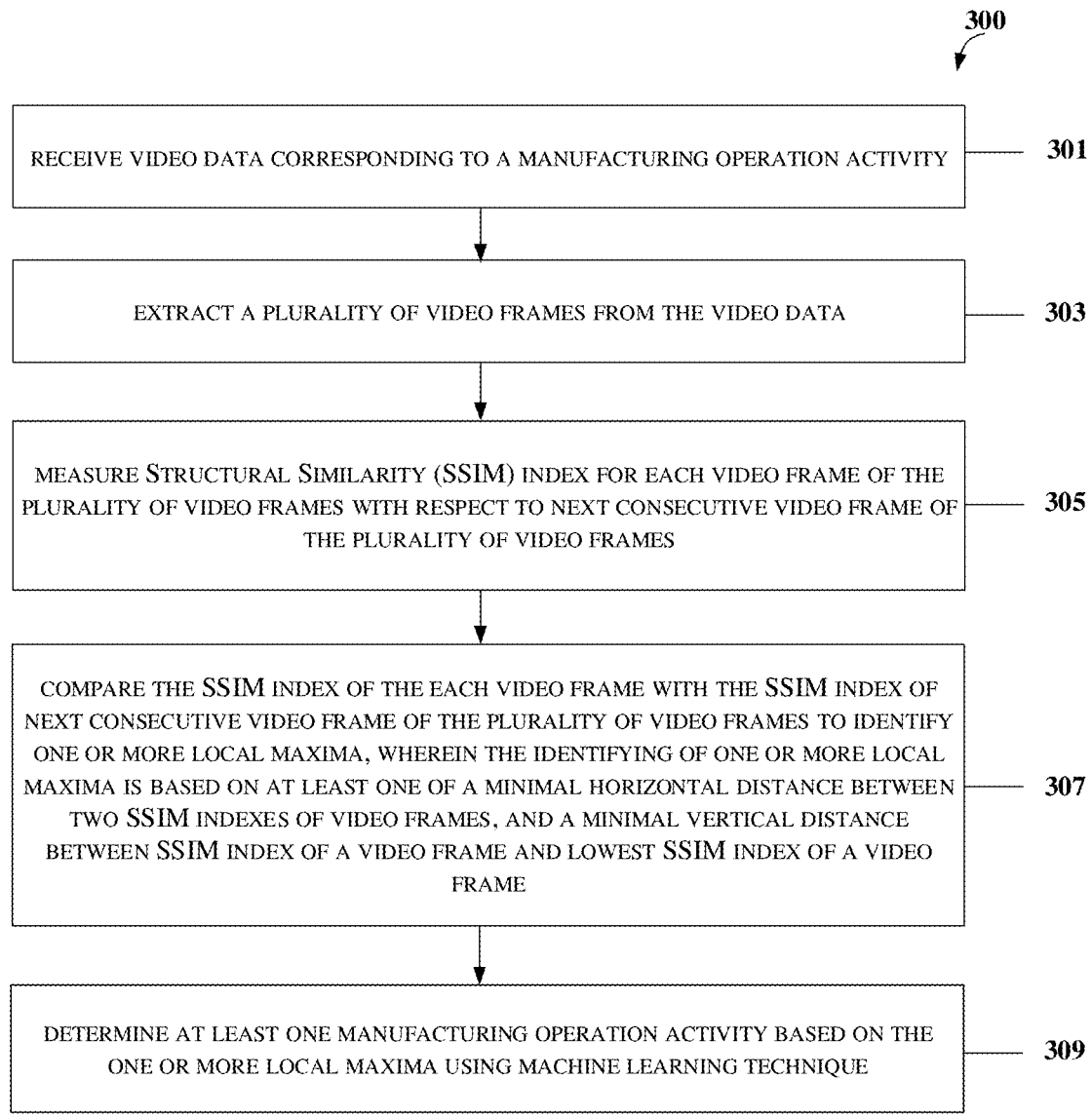
FIG. 3 illustrates a flowchart showing a method for monitoring manufacturing operation workflow in accordance with some embodiments of present disclosure.

FIG. 3 illustrates a flowchart showing a method for monitoring manufacturing operation workflow in accordance with some embodiments of present disclosure.

As illustrated in FIG. 3, the method 300 includes one or more blocks for monitoring manufacturing operation workflow. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the pre-processing module 213 of the workflow monitoring system 107 may receive video data corresponding to a manufacturing operation activity.

At block 303, the pre-processing module 213 of the workflow monitoring system 107 may extract a plurality of video frames from the video data. The pre-processing module 213 may convert the plurality of video frames to a grayscale format.

At block 305, the detection module 215 of the workflow monitoring system 107 may measure the Structural Similarity (SSIM) index for each video frame of the plurality of video frames with respect to next consecutive video frame of the plurality of video frames.

At block 307, the detection module 215 of the workflow monitoring system 107 may compare the SSIM index of the each video frame with the SSIM index of next consecutive video frame of the plurality of video frames to identify one or more local maxima. The identifying of one or more local maxima may be based on at least one of a minimal horizontal distance between two SSIM indexes of video frames, and a minimal vertical distance between SSIM index of a video frame and lowest SSIM index of a video frame.

At block 309, the detection module 215 of the workflow monitoring system 107 may determine at least one manufacturing operation activity based on the one or more local maxima using machine learning technique.

Some of the advantages of the present disclosure are listed below.

The present disclosure automates the process of activity detection and analysis, by automatically identifying activities and sub-activities start and end times using the structural similarity-index based approach, thereby, automating the process of operations/activity analysis.

The present disclosure allows monitoring the performance of manufacturing operation activity without pre-built template for comparing the real-time captured video, resulting in a significant reduction of processing/analysis time.

Since the method presented in the present disclosure doesn't need template for matching/comparing with real-time captured video, the requirement of huge set of template repository is overcome, leading to significant increase in system operating efficiency.

The present disclosure allows monitoring of a completely new production/manufacturing operation as the method presented in the present disclosure does not need templates to be available in a repository.

In present disclosure, video frames with a RGB color format are converted to a grayscale format. This conversion to the grayscale format significantly improves the performance of SSIM technique and requires less processing power and memory in comparison to processing video frames in the RGB color format. Furthermore, consecutive video frames that are similar to each other (i.e. similarity is greater than 97%) are excluded from subsequent processing steps. This approach of excluding similar video frames further increases the overall system performance.

The present disclosure allows identifying manual process defects in manufacturing operation tasks.

Computing System

Figure 4:
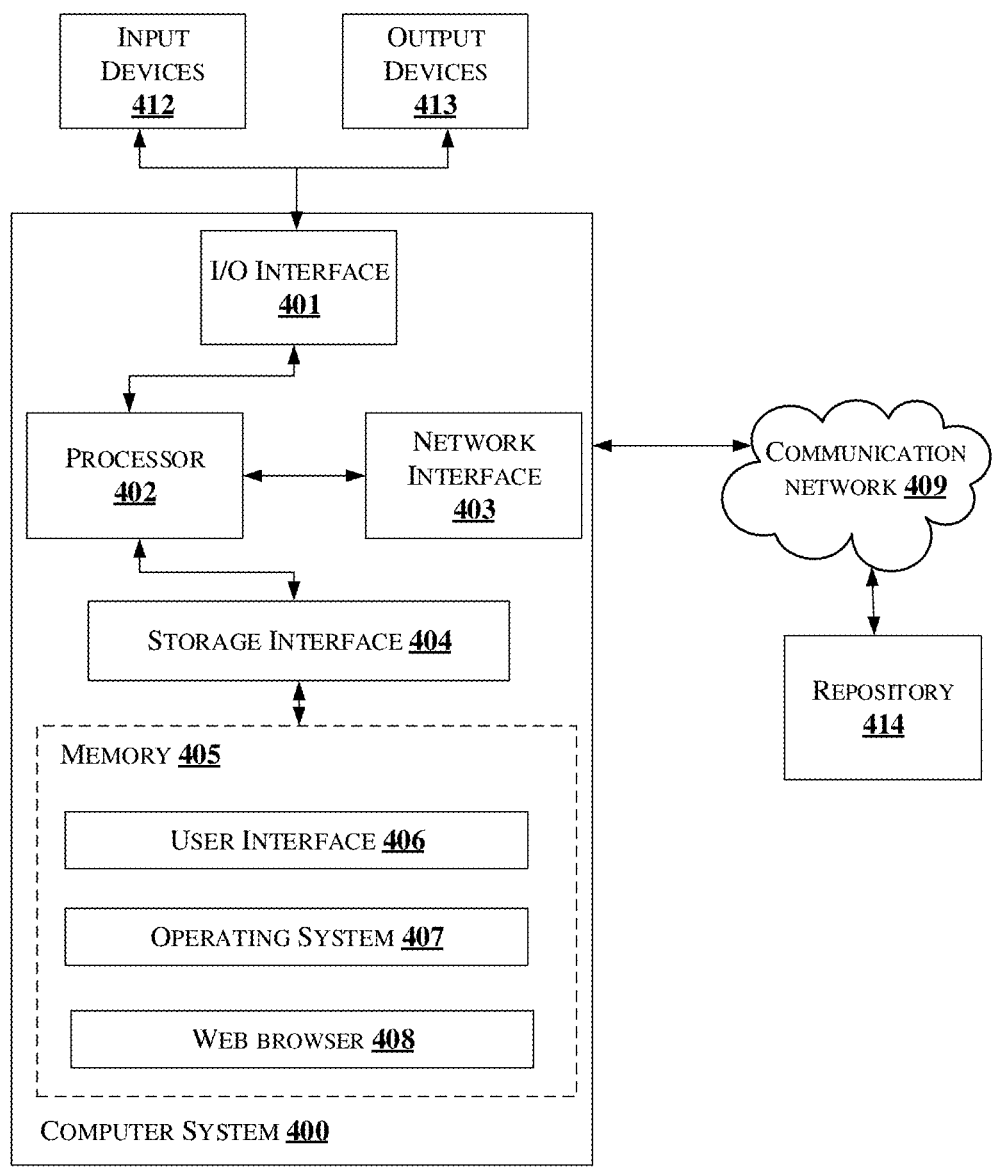
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be used to implement the workflow monitoring system 107. The computer system 400 may include a central processing unit ("CPU" or "processor") 402. The processor 402 may include at least one data processor for monitoring manufacturing operation workflow. The processor 402 may include specialized processing units such as, integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax), or the like, etc.

Using the I/O interface 401, the computer system 400 may communicate with one or more I/O devices such as input devices 412 and output devices 413. For example, the input devices 412 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 413 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 400 consists of the workflow monitoring system 107. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 may include, without limitation, a direct interconnection, Local Area Network (LAN), Wide Area Network (WAN), wireless network (e.g., using Wireless Application Protocol), the Internet, etc. Using the network interface 403 and the communication network 409, the computer system 400 may communicate with a repository 414. The network interface 403 may employ connection protocols include, but not limited to, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 includes, but is not limited to, a direct interconnection, a Peer to Peer (P2P) network, Local Area Network (LAN), Wide Area Network (WAN), wireless network (e.g., using Wireless Application Protocol), the Internet, Wi-Fi and such.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, etc. In some embodiments, computer system 400 may store user/application data, such as, the data, variables, records, etc., as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. The computer system 400 may implement a mail server (not shown in FIG. 4) stored program component. The mail server may be an Internet mail server such as Microsoft Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. The computer system 400 may implement a mail client (not shown in FIG. 4) stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

REFERRAL NUMERALS

| Reference number | Description |
| --- | --- |
| 100 | Environment |
| 101 | Video capturing unit |
| 103 | Repository |
| 105 | Communication network |
| 107 | Workflow monitoring system |
| 111 | I/O interface |
| 113 | Memory |
| 115 | Processor |
| 201 | Data |
| 203 | Video data |
| 205 | Other data |
| 211 | Modules |
| 213 | Pre-processing module |
| 215 | Detection module |
| 217 | Comparison module |
| 219 | Assessment module |
| 221 | Other modules |
| 400 | Computer system |
| 401 | I/O interface |
| 402 | Processor |
| 403 | Network interface |
| 404 | Storage interface |
| 405 | Memory |
| 406 | User interface |
| 407 | Operating system |
| 408 | Web browser |
| 409 | Communication network |
| 412 | Input devices |
| 413 | Output devices |
| 414 | Repository |

What is claimed is:

1. A method for monitoring manufacturing operation workflow, the method comprising:
   receiving, by a workflow monitoring system, video data corresponding to a manufacturing operation activity;
   extracting, by the workflow monitoring system, a plurality of video frames from the video data;
   measuring, by the workflow monitoring system, Structural Similarity (SSIM) index for each video frame of the plurality of video frames with respect to next consecutive video frame of the plurality of video frames;
   comparing, by the workflow monitoring system, the SSIM index of the each video frame with the SSIM index of next consecutive video frame of the plurality of video frames to identify one or more local maxima, wherein the identifying of one or more local maxima is based on at least one of a minimal horizontal distance between two SSIM indexes of video frames, and a minimal vertical distance between SSIM index of a video frame and lowest SSIM index of a video frame; and determining, by the workflow monitoring system, at least one manufacturing operation activity based on the one or more local maxima using machine learning technique.

2. The method as claimed in claim 1, wherein the method further comprises:
converting, by the workflow monitoring system, the plurality of video frames to a grayscale format.

3. The method as claimed in claim 1, wherein the measuring of SSIM index for each video frame of the plurality of video frames further comprises:
removing, by the workflow monitoring system, one or more video frame from the plurality of video frames when the SSIM index is greater than a predefined value.

4. The method as claimed in claim 1, wherein determining of at least one manufacturing operation activity based on the one or more local maxima further comprising:
determining, by the workflow monitoring system, time interval for each of the at least one manufacturing operation activity to identify variation in manufacturing operation activity.

5. The method as claimed in claim 1, the method further comprising:
extracting, by the workflow monitoring system, parameters related to the at least one manufacturing operation activity;
comparing, by the workflow monitoring system, the extracted parameters with historic parameters related to past manufacturing operation activity; and
calculating, by the workflow monitoring system, Key Performance Indicator (KPI) related to the at least one manufacturing operation activity based on comparison.

6. A workflow monitoring system for monitoring manufacturing operation workflow, the system comprising:
a processor; and
a memory communicatively coupled to the processor, wherein the memory stores processor-executable instructions, which on execution, cause the processor to:
receive video data corresponding to a manufacturing operation activity;
extract a plurality of video frames from the video data;
measure Structural Similarity (SSIM) index for each video frame of the plurality of video frames with respect to next consecutive video frame of the plurality of video frames;
compare the SSIM index of the each video frame with the SSIM index of the next consecutive video frame of the plurality of video frames to identify one or more local maxima, wherein the identifying of one or more local maxima is based on at least one of a minimal horizontal distance between two SSIM indexes of video frames, and a minimal vertical distance between SSIM index of a video frame and lowest SSIM index of a video frame; and
determine at least one manufacturing operation activity based on the one or more local maxima using machine learning technique.

7. The workflow monitoring system as claimed in claim 6, wherein the system causes the processor to:
convert the plurality of video frames to a grayscale format.

8. The workflow monitoring system as claimed in claim 6, wherein the system causes the processor to:
remove one or more video frame from the plurality of video frames when the SSIM index is greater than a predefined value.

9. The workflow monitoring system as claimed in claim 6, wherein the system causes the processor to:
determine time interval for each of the at least one manufacturing operation activity to identify variation in manufacturing operation activity.

10. The workflow monitoring system as claimed in claim 6, wherein the system causes the processor to:
extract parameters related to the at least one manufacturing operation activity;
compare the extracted parameters with historic parameters related to past manufacturing operation activity; and
calculate Key Performance Indicator (KPI) related to the at least one manufacturing operation activity based on comparison.

11. A non-transitory computer readable medium including instructions stored thereon that when processed by at least one processor cause a workflow monitoring system to perform operations comprising:
receiving video data corresponding to a manufacturing operation activity;
extracting a plurality of video frames from the video data;
measuring Structural Similarity (SSIM) index for each video frame of the plurality of video frames with respect to next consecutive video frame of the plurality of video frames;
comparing the SSIM index of the each video frame with the SSIM index of next consecutive video frame of the plurality of video frames to identify one or more local maxima, wherein the identifying of one or more local maxima is based on at least one of a minimal horizontal distance between two SSIM indexes of video frames, and a minimal vertical distance between SSIM index of a video frame and lowest SSIM index of a video frame; and
determining at least one manufacturing operation activity based on the one or more local maxima using machine learning technique.

12. The medium as claimed in claim 11, wherein the instruction causes the processor to:
convert the plurality of video frames to a grayscale format.

13. The medium as claimed in claim 11, wherein the instruction causes the processor to:
remove one or more video frame from the plurality of video frames when the SSIM index is greater than a predefined value.

14. The medium as claimed in claim 11, wherein the instruction causes the processor to:
determine time interval for each of the at least one manufacturing operation activity to identify variation in manufacturing operation activity.

15. The medium as claimed in claim 11, wherein the instruction causes the processor to:
extract parameters related to the at least one manufacturing operation activity;
compare the extracted parameters with historic parameters related to past manufacturing operation activity; and
calculate Key Performance Indicator (KPI) related to the at least one manufacturing operation activity based on comparison.

* * * * *